United States Patent
Hanks et al.

(10) Patent No.: US 10,543,667 B2
(45) Date of Patent: Jan. 28, 2020

(54) EASY OPENING METALIZED HERMETIC FILMS AND METHODS TO MANUFACTURE THE SAME

(71) Applicant: Toray Plastics (America), Inc., North Kingstown, RI (US)

(72) Inventors: Adam Hanks, Wakefield, RI (US); Joshua R. Cloutier, Exeter, RI (US); Keunsuk P. Chang, North Kingstown, RI (US)

(73) Assignee: Toray Plastics (America), Inc., North Kingstown, RI (US)

(*) Notice: Subject to any disclaimer, the term of this patent is extended or adjusted under 35 U.S.C. 154(b) by 170 days.

(21) Appl. No.: 15/396,043

(22) Filed: Dec. 30, 2016

(65) Prior Publication Data

US 2018/0186136 A1    Jul. 5, 2018

(51) Int. Cl.
*B32B 27/36* (2006.01)
*B32B 27/32* (2006.01)
(Continued)

(52) U.S. Cl.
CPC ............. *B32B 27/36* (2013.01); *B32B 27/32* (2013.01); *B05D 1/265* (2013.01); *B32B 7/02* (2013.01);
(Continued)

(58) Field of Classification Search
None
See application file for complete search history.

(56) References Cited

U.S. PATENT DOCUMENTS 4,661,395 A * 4/1987 Akao ............... B32B 15/08
428/213
4,756,917 A * 7/1988 Kamada ............ B32B 15/08
428/457

(Continued)

FOREIGN PATENT DOCUMENTS

CN          201198229 Y  *  2/2009
JP          2001-253444 A  *  9/2001

OTHER PUBLICATIONS

Chang, K. et al., "Hermetic-seal performance of BOPP laminate structures in VFFS pouch applications," downloaded at https://1pdf.net/hermetic-seal-performance-of-bopp-laminate-structures-in-vffs-_5858d9f1e12e893065d8b759, 2016, pp. 56-60 (4 pages).

*Primary Examiner* — Vivian Chen
(74) *Attorney, Agent, or Firm* — Nixon Peabody LLP

(57) ABSTRACT

Composite film structures for packaging use. The composite film structures have easy open, clean peel and hermetic seal characteristics stemming from good caulkability characteristics when a region of the composite film structures are folded over and sealed to form a seal on a bag, pouch or package. The composite film structure includes a base film which includes a biaxially-oriented film and a vacuum-deposited metal layer and a heat-sealant structure comprising a low density polyethylene and a linear low density polyethylene. The metal layer is between the biaxially-oriented film and the heat-sealant structure. The heat-sealant structure thickness is from about 50 to about 100 gauge, the adhesion strength between the biaxially-oriented film and the metal layer is less than about 800 g/in, and the seal strength when a region of the composite film structure is folded onto a composite film structure region is from about 500 to about 1500 g/in.

12 Claims, 6 Drawing Sheets

(51) Int. Cl.
  *B05D 1/26* (2006.01)
  *B32B 37/15* (2006.01)
  *B32B 15/08* (2006.01)
  *B32B 15/085* (2006.01)
  *B32B 7/06* (2019.01)
  *B32B 15/09* (2006.01)
  *B32B 27/08* (2006.01)
  *B32B 7/02* (2019.01)
  *B32B 15/04* (2006.01)
  *C08L 23/06* (2006.01)
  *C09J 123/06* (2006.01)
  *B32B 15/20* (2006.01)
  *B32B 7/04* (2019.01)

(52) U.S. Cl.
  CPC . *B32B 7/04* (2013.01); *B32B 7/06* (2013.01); *B32B 15/04* (2013.01); *B32B 15/08* (2013.01); *B32B 15/085* (2013.01); *B32B 15/09* (2013.01); *B32B 15/20* (2013.01); *B32B 27/08* (2013.01); *B32B 27/327* (2013.01); *B32B 37/153* (2013.01); *B32B 2250/05* (2013.01); *B32B 2255/10* (2013.01); *B32B 2307/31* (2013.01); *B32B 2307/518* (2013.01); *B32B 2307/748* (2013.01); *B32B 2311/00* (2013.01); *B32B 2323/046* (2013.01); *B32B 2323/10* (2013.01); *B32B 2367/00* (2013.01); *B32B 2439/46* (2013.01); *B32B 2439/70* (2013.01); *B32B 2581/00* (2013.01); *C08L 23/06* (2013.01); *C09J 123/06* (2013.01); *Y10T 428/1334* (2015.01); *Y10T 428/1338* (2015.01); *Y10T 428/26* (2015.01); *Y10T 428/269* (2015.01); *Y10T 428/2817* (2015.01); *Y10T 428/2826* (2015.01); *Y10T 428/2878* (2015.01); *Y10T 428/31678* (2015.04); *Y10T 428/31692* (2015.04); *Y10T 428/31786* (2015.04); *Y10T 428/31855* (2015.04); *Y10T 428/31909* (2015.04); *Y10T 428/31913* (2015.04); *Y10T 428/31938* (2015.04)

(56) References Cited

U.S. PATENT DOCUMENTS

| | | | | |
|---|---|---|---|---|
| 4,804,430 A * | 2/1989 | Miekka | B44C 1/14 | 156/233 |
| 4,837,061 A * | 6/1989 | Smits | B65D 55/026 | 283/108 |
| 4,897,533 A * | 1/1990 | Lyszczarz | G06K 19/06046 | 235/487 |
| 4,994,314 A * | 2/1991 | Rosenfeld | C25D 11/02 | 205/118 |
| 5,006,378 A * | 4/1991 | Itaba | B32B 27/32 | 428/34.9 |
| 5,015,318 A * | 5/1991 | Smits | B65D 55/026 | 156/233 |
| 5,017,429 A * | 5/1991 | Akao | B32B 15/08 | 428/349 |
| 5,110,670 A * | 5/1992 | Janocha | B32B 27/20 | 428/216 |
| 5,235,149 A * | 8/1993 | Boehrer | B32B 15/08 | 219/734 |
| 5,427,807 A * | 6/1995 | Chum | B29C 47/0004 | 426/127 |
| 5,510,171 A * | 4/1996 | Faykish | B32B 27/08 | 428/32.62 |
| 5,847,053 A * | 12/1998 | Chum | B29C 47/0004 | 525/240 |
| 5,932,150 A * | 8/1999 | Lacey | B29C 55/143 | 264/1.34 |
| 6,033,786 A * | 3/2000 | Fatica | B32B 15/08 | 428/461 |
| 6,534,137 B1 * | 3/2003 | Vadhar | B32B 27/32 | 428/34.9 |
| 7,812,094 B2 * | 10/2010 | Kvamme | B32B 27/32 | 525/240 |
| 9,561,886 B2 | 2/2017 | Paolilli | | |
| 2002/0004112 A1 * | 1/2002 | Muller | B32B 27/32 | 428/35.3 |
| 2002/0015897 A1 * | 2/2002 | Toshine | G03H 1/0252 | 430/2 |
| 2006/0046048 A1 * | 3/2006 | Kapur | B32B 27/08 | 428/349 |
| 2009/0322538 A1 * | 12/2009 | Kobren | C23C 28/00 | 340/572.8 |
| 2010/0270309 A1 * | 10/2010 | Files | B32B 27/32 | 220/359.1 |
| 2010/0273017 A1 * | 10/2010 | Files | B32B 27/32 | 428/513 |
| 2010/0273377 A1 * | 10/2010 | Files | B32B 27/32 | 442/49 |
| 2010/0297371 A1 * | 11/2010 | Mitani | B32B 27/30 | 428/35.4 |
| 2011/0212283 A1 * | 9/2011 | Fantinel | C08J 5/18 | 428/36.92 |
| 2012/0100320 A1 * | 4/2012 | Toft | B32B 7/02 | 428/35.6 |
| 2012/0171453 A1 * | 7/2012 | Rochat | B32B 27/08 | 428/220 |
| 2012/0207954 A1 * | 8/2012 | Dalpe | B65D 31/02 | 428/35.4 |
| 2013/0068769 A1 | 3/2013 | Sharps | | |
| 2013/0260122 A1 | 10/2013 | Siu | | |
| 2014/0017474 A1 | 1/2014 | Narkevicius | | |
| 2014/0124128 A1 * | 5/2014 | Moritz | B32B 37/025 | 156/233 |
| 2014/0252001 A1 | 9/2014 | Paolilli | | |
| 2015/0114551 A1 * | 4/2015 | Moritz | B44C 1/14 | 156/233 |
| 2018/0281367 A1 | 10/2018 | Hanks | | |

* cited by examiner

EASY OPENING METALIZED HERMETIC FILMS AND METHODS TO MANUFACTURE THE SAME

FIELD OF INVENTION

This invention provides for a hermetic heat seal film for packaging applications that additionally provides an easy open or easy peel consumer feature by controlled failure at the interface between the metal portion and the biaxially-oriented film portion of the base film of the composite film structure, and a clean peel appearance once separated.

BACKGROUND OF INVENTION

Consumer and food producer demands of flexible food packaging continue to evolve and become increasingly challenging. Consumers prefer an "easy open" or easy peel package that only requires only moderate strength to open the package and where the package opens in a clean and concise manner. In this manner, the package will not accidently open with normal handling but will open cleanly under hand force without use of special tear notches, scoring, perforations, or mechanical devices. Generally, seal forces less than about 1500 g/in (about 590 g/cm) are required for the food packaging to be considered an "easy open" package.

In a similar manner, many food producers prefer a package that has improved seal hermetics and product shelf life. Improved seal hermetics extend the shelf life of food products and help to keep moisture and air from entering the product space where the food is contained. Hermetic seals extend the shelf life of the food product and improve the consumer's experience.

To improve the hermetic properties of finished food packaging, laminations have been done with specialty sealant films that are usually blown and generally constitute metallocene-catalyzed linear low density polyethylene (m-LLDPE) or similar layers. Commonly, such films are greater than 1.3 mil (130 gauge or 32.5 µm) in thickness and are laminated to biaxially-oriented polypropylene (BOPP) or polyethylene terephthalate (PET) films. While such prior art films can provide desired hermetic properties, such films are disadvantageous as they are quite thick and require more materials and are, thus, not as desirable for economic and environmental sustainability reasons. Significant economic and environmental sustainability benefits would be achieved if a thinner extrusion coating layer could be used while still providing similar hermetic performance levels.

Other packaging solutions available in the prior art satisfy the desired hermeticity requirement or the desired easy peel requirement but not both at the same time. For example, cast polypropylene laminated to cast or blown polyethylene achieves hermetic seals but not easy peel. Conversely, a seal layer comprising polyethylene contaminated with polybutylene achieves easy peel but not hermeticity.

There is, therefore, a need in the food packaging industry for a heat-sealing film that combines easy open or easy peel characteristics and hermeticity and which at the same time is achieved by a one-step extrusion coating process. A reduction in steps can be achieved by use of an extrusion coating of m-LLDPE or linear-low density polyethylene (LLDPE) layers. This can open up opportunities and designs to a wider customer base as the final package construction can be reduced from a print web/barrier web/blown sealant with either extrusion or adhesive laminations between each web and replaced by a print web/extrusion coated barrier web. Due to the generally higher melt indices of extrusion coating polymers versus blown polymers, sealability can be improved due to the easier nature for flow of the extrusion coating polymer. This, in turn, gives an advantage in down-gauging and improved economics/waste reduction.

Additionally, many consumers desire an easy open package that takes nominal force to open less than about 1500 g/in (about 590 g/cm). Generally, forces above this range are often too high for some users and require technologies such as laser scoring, perforations, tear notches, scissors, etc. for the consumer to open the package. As mentioned earlier, easy-peelable structures are not uncommon in the industry but generally require doping the sealant layer interface with a slightly incompatible component, which compromises hermeticity.

SUMMARY OF THE INVENTION

According to one embodiment, a composite film structure comprising a base film which comprises a biaxially-oriented film and a vacuum-deposited metal layer and a heat-sealant structure which comprises a low density polyethylene and a linear low density polyethylene. The thickness of the heat-sealant structure is from about 50 to about 100 gauge (Ga) (about 13 to about 25 µm). The metal layer is located between the biaxially-oriented film and the heat-sealant structure. The adhesion strength between the biaxially-oriented film and the metal layer is less than about 800 g/in (about 315 g/cm). The seal strength of the composite film structure heat-sealed onto itself on the heat-sealant side of the composite film structure is from about 500 to about 1500 g/in (about 197 to about 590 g/cm), wherein the heat-seal is a hermetic seal. Separation of the heat-sealed composite film structure occurs at an interface between the metal layer and the biaxially-oriented film and is characterized by the absence of stringing. A bag seal formed from the composite film structure of this embodiment passes the dunk test using a Package Integrity Model H Dunk Tank tester manufactured by Visual Check International Packaging Integrity Systems and ASTM D3078-02 (2013).

According to another embodiment, a composite film structure comprising a base film which comprises a biaxially-oriented film and a vacuum-deposited metal layer and a heat-sealant structure which comprises at least three layers. The biaxially-oriented film is adjacent to the metal layer. The thickness of the heat-sealant structure is from about 50 to about 100 gauge (Ga) (about 13 to about 25 µm). The heat-sealant structure comprises at least a first layer comprising low density polyethylene, a second layer comprising linear low density polyethylene or a metallocene-catalyzed linear low density polyethylene, and a third layer comprising linear low density polyethylene or a metallocene-catalyzed linear low density polyethylene. The first layer is located adjacent to the second layer. The second layer is located adjacent to the third layer and the first layer located adjacent to the metal layer. The adhesion strength between the biaxially-oriented film and the metal layer is less than about 800 g/in (about 315 g/cm). The seal strength of the composite film structure heat-sealed onto itself on the heat-sealant side of the composite film structure is from about 500 to about 1500 g/in (about 197 to about 590 g/cm), wherein the heat-seal is a hermetic seal. Separation of the heat-sealed composite film structure occurs at an interface between the metal layer and the biaxially-oriented film and is characterized by the absence of stringing. A bag seal formed from the composite film structure of this embodiment passes the dunk test using a Package Integrity Model H Dunk Tank tester manufactured by Visual Check International Packaging Integrity Systems and ASTM D3078-02 (2013).

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1:
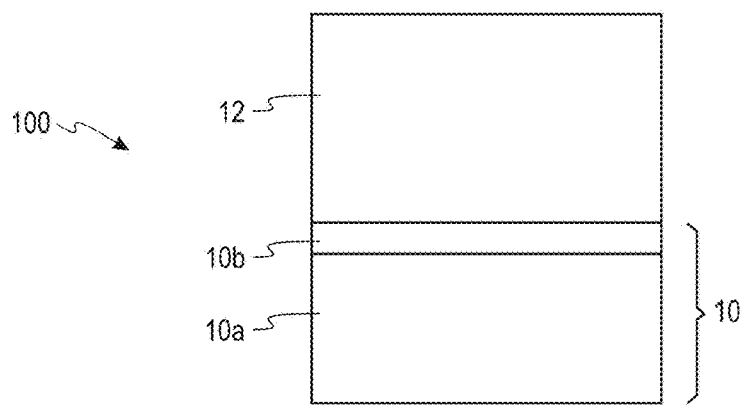
FIG. 1 is a generally cross-sectional view of a film according to one embodiment of the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The invention relates to a composite film structure for use as a component in packaging structures such as bags comprising metalized biaxially-oriented polypropylene or metalized biaxially-oriented polyester base film and a heat-sealant structure extrusion-coated onto the metal side of the base film. It has been discovered that one can make a hermetic controlled heat-sealing film by utilizing the metal adhesion properties of the underlying metalized base film. Providing high bonding strength of the extrusion-coated heat-sealant structure to the metal deposition side of the metalized base film and a medium-low bonding between the metal layer of the base film and the biaxially-oriented film portion of the base film can then cleanly remove the metal layer and provide an easy opening package. It is noted that the internal strength of the heat-sealant structure is another important aspect of the inventive composite film structure(s) as increasing the internal strength (through thickness or material selection) will encounter a point where the heat-sealant structure will not cleanly fracture and stringing (fibrous strands that extend between the two separating surfaces) will result.

The inventive composite film structures offer hermetic seal characteristics by virtue of improved caulkability of one or more of the seal layer ingredients, easy peel or easy open characteristics through controlled failure at the interface between the metal portion and the biaxially-oriented film portion of the base film of the composite film structure, and a clean peel or delamination upon separation. Hermeticity (hermetic seal) refers to forming a package structure (e.g., a bag or a pouch) that shows no leaks during an industry-recognized standard test such as the "dunk test." Easy peel refers to seal strength in the range about 500 to about 1500 g/in (about 197 to about 590 g/cm) as detailed below. Seal strength lower than about 500 g/in (about 197 g/cm) is generally detrimental to hermeticity and generally causes issues with handling such as the potential for bursting when placing into cartons/boxes and higher than about 1500 g/in (about 590 g/cm) generally causes the package to be difficult to peel open manually. A clean peel or a clean peel appearance means no "stringing" (i.e., fibrous strands extending between the two separating surfaces or remaining on the separated surface) upon separation or delamination. Caulkability refers to "caulking" or filling up any open gaps created in the bag-making process when the composite film structure is ultimately folded over and sealed to form a seal on a bag, pouch or other flexible package. Caulkabilty is a characteristic of the active ingredient(s) selected for the seal layer and, in turn, contributes to improved seal hermetics.

Referring to FIG. 1, the composite film structure 100 of the present invention comprises (1) a base film 10 which includes a biaxially-oriented film 10a and a metal layer 10b and (2) a heat-sealant structure 12 which is adjacent to the base film 10. More specifically, the heat-sealant structure 12 is adjacent to the metal layer 10b. In other words, the metal layer 10b is located between the biaxially-oriented film 10a and the heat-sealant structure 12. The heat-sealant structure 12 is extrusion-coated onto the metalized side (i.e., the metal layer 10b) of the base film 10 according to one method. This one-step extrusion coating process reduces the number of steps involved in the inventive process.

Figure 2:
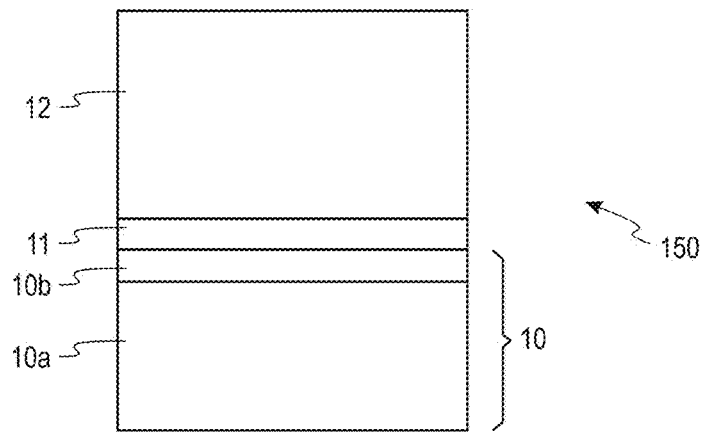
FIG. 2 is a generally cross-sectional view of a film according to another embodiment of the present invention.

Referring to FIG. 2, the composite film structure 150 of the present invention comprises (1) the base film 10 which includes the biaxially-oriented film 10a and the metal layer 10b, (2) the heat-sealant structure 12, and (3) an optional primer layer 11 located between the base film 10 and the heat-sealant structure 12 and, more specifically, between the metal layer 10b and the heat-sealant structure 12.

Figure 3:
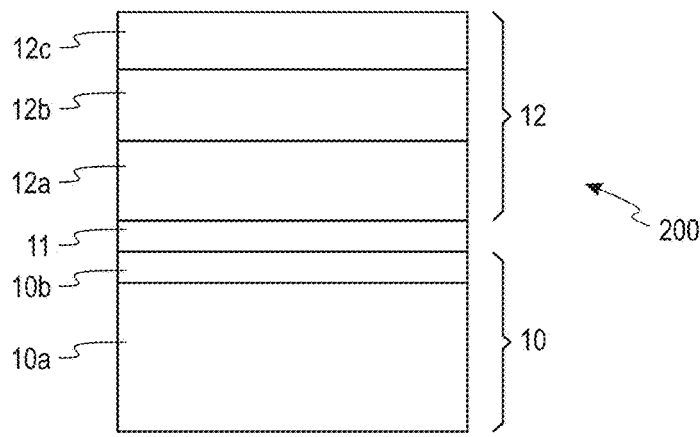
FIG. 3 is a generally cross-sectional view of a film according to a further embodiment of the present invention.

The heat-sealant structure 12 of the present invention can be a monolayer extrusion coating such as that shown in FIG. 1. The heat-sealant structure 12 of the present invention can also be multilayered. FIG. 3 shows an example of a film according to the present invention where the heat-sealant structure is multilayered. It is contemplated that the heat-sealant structure 12 may comprise two or more layers, preferably three layers (layers 12a, 12b, and 12c) as discussed in more detail below.

The base film 10 comprises the biaxially-oriented film 10a and the metal layer 10b. The biaxially-oriented film 10a comprises a biaxially-oriented polypropylene (OPP) or a biaxially-oriented polyester. One example of a suitable biaxially-oriented polyester is polyethylene terephthalate (PET). Another example of a suitable biaxially-oriented polyester is a biaxially-oriented polyester comprising ethylene terephthalate repeat units (BOPET). In either case, the biaxially-oriented film 10a is produced by melt extrusion followed by biaxial orientation. The biaxially-oriented film 10a is the non-metalized portion of the base film 10.

Typical polyester resins used in the biaxially-oriented film 10a include, but are not limited to, homopolyesters or copolyesters of polyethylene terephthalate (PET), polyethylene naphthalate (PEN), polyethylene terephthalate-co-isophthalate copolymer, polyethylene terephthalate-co-naphthalate copolymer, polycyclohexylene terephthalate, polyethylene-co-cyclohexylene terephthalate, polyether-ester block copolymer, ethylene glycol or terephthalic acid-based polyester homopolymers and copolymers, and combinations thereof.

The metal layer 10b is typically applied by vacuum-deposition. The metal layer 10b may include titanium, vanadium, chromium, manganese, iron, cobalt, nickel, copper, zinc, aluminum, gold, or palladium, the preferred being aluminum. The use of aluminum in the metal layer 10b provides improved gas (oxygen) and moisture barrier properties to the composite film structure to aid in keeping the bag contents dry. Metal oxides such as aluminum oxide or silicon oxide are also contemplated for use in the metal layer 10b.

Referring to FIG. 3, the composite film structure 200 of the present invention comprises (1) the base film 10 which includes the biaxially-oriented film 10a and the metal layer 10b, (2) the heat-sealant structure 12 which includes a first sealant layer 12a, a second sealant layer 12b and a third sealant layer 12c, and (3) the primer layer 11. The biaxially-oriented film 10a is adjacent to the metal layer 10b. The first sealant layer 12a is adjacent to the second sealant layer 12b, and the second sealant layer 12b is adjacent to the third sealant layer 12c. The optional primer layer 11 of FIG. 3 is located between the base film 10 and the heat-sealant structure 12. More specifically, optional primer layer 11 is located between the first sealant layer 12a and the metal layer 10b. If the optional primer layer 11 is not used (not shown), the first sealant layer 12a is located adjacent to the metal layer 10b. The heat-sealant structure 12 is extrusion-coated on top of the metalized side (i.e., the metal layer 10b) of the base film 10. This one-step extrusion coating process reduces the number of steps involved in the inventive process.

The heat-sealant structure (whether of the monolayer type as shown in structure 12 of FIG. 1 or the multilayered type as shown in structure 12 of FIG. 3) comprises at least two different types of polyethylene resins: low density polyethylene (LDPE) and linear low density polyethylene (LLDPE).

The LDPE resin content in the heat-sealant structure 12 (whether of the monolayer or the multilayered type and, therefore, taken as a total) is typically from about 50 to about 90 wt. %. In some embodiments, the LDPE resin content is from about 60 to about 85 wt. % and from about 65 to about 80 wt. % in other embodiments. In still further embodiments, the LDPE resin content is from about 10 to about 90 wt. %, from about 20 to about 80 wt. %, from about 30 to about 70 wt. % or from about 40 to about 60 wt. %.

The LLDPE resin content in the heat-sealant structure 12 (whether of the monolayer or the multilayered type and, therefore, taken as a total) is typically from about 5 to about 50 wt. %. In some embodiments, the LLDPE resin content is from about 10 to about 40 wt. % and from about 15 to about 35 wt. % in other embodiments. In still further embodiments, the LDPE LLDPE resin content is from about 10 to about 90 wt. %, from about 20 to about 80 wt. %, from about 30 to about 70 wt. % or from about 40 to about 60 wt. %.

LDPE is produced by polymerizing ethylene monomer in the absence of catalyst in a high-pressure autoclave process: this process results in high degree of branching, a wide distribution of branch lengths and a broad molecular weight distribution, which in turn provides robust extrusion coating processability characterized by high melt strength and low degree of necking.

LLDPE is a substantially linear polyethylene polymer with significant numbers of short branches, commonly made by copolymerization of ethylene with longer-chain olefins. LLDPE differs structurally from conventional LDPE because of the absence of long chain branching. The linearity of LLDPE results from the different manufacturing processes of LLDPE and LDPE. In general, LLDPE is produced at lower temperatures and pressures by copolymerization of ethylene and such higher alpha-olefins as butene, hexene, or octene. The copolymerization process produces an LLDPE polymer that has a narrower molecular weight distribution than conventional LDPE and in combination with the linear structure, significantly different rheological properties. These rheological properties give it superior heat seal strength, hot tack, and caulkability. A subcategory of LLDPE resin is that based on single-site (metallocene) catalysts which result in more regular distribution of branching sites resulting in enhanced sealing performance. Such resins are metallocene-catalyzed linear low density polyethylene resins and referred to as "m-LLDPE."

Referring to FIG. 1 and FIG. 2, the heat-sealant structure 12 comprises at least two different types of polyethylene resins: low density polyethylene (LDPE) and linear low density polyethylene (LLDPE). The LLDPE in the heat-sealant structure 12 of FIGS. 1 and 2 is typically a metallocene-catalyzed linear low density polyethylene (m-LLDPE) resin. The LLDPE or m-LLDPE in the heat-sealant structure 12 is the sealant or active ingredient component. In addition to the conventional LDPE resin and the LLDPE or m-LLDPE, the heat-sealant structure 12 may optionally include a plastomer. A plastomer refers to an LLDPE-type ethylene α-olefin copolymer with longer or more branches than those present in typical LLDPE. Plastomers bridge the gap between elastomers and plastics with rubber-like properties and the processability of plastic.

Referring to FIG. 3, the sealant layers 12a, 12b, and 12c of the heat-sealant structure 12 are heat-sealant, extrusion-coated layers. The sealant layers 12b and 12c of the heat-sealant structure 12 include a sealant or active ingredient material such as the LLDPE or the m-LLDPE. The first sealant layer 12a acts as a tie layer to the base film 10 (with or without the primer layer 11 in between) and is typically a conventional high-pressure autoclave polymerized LDPE resin such as, but not limited to, Marflex® 1017 and Marflex® 1019 (Chevron Philips) and Dow LDPE 722 (Dow Chemical Co.). These materials are characterized by high melt strength and are known for excellent extrusion coating performance, stability and high melt strength, and low degree of "necking". Another advantage of these LDPE material(s) is the high bonding strength to the metal side of base film 10 achieved by the surface oxidation of the melt curtain emerging from the die. Surface oxidation can be controlled by melt temperature and the amount of time within the air gap as determined by the line speed and the distance between the die exit and the contact with the film. Additionally, an optional ozone generating unit could supply ozone gas within this gap to aid in oxidation of the polymer surface and increase processing windows (as lower extrusion temperatures and/or smaller amount of time within the air gap). Using these LDPE material(s) in first sealant layer 12a provides a good extrusion coating base upon which the second and third sealant layers 12b and 12c (which carry the seal and hermeticity enhancing component) can be consistently laid down.

Typically, the second and third sealant layers (12b and 12c, respectively) each independently comprise a blend of at least a LDPE resin and a LLDPE-based resin. The LLDPE-based resin is typically a metallocene-catalyzed linear low density polyethylene (m-LLDPE) resin. The use of the m-LLDPE component contributes at least lower heat seal temperature, higher hot-tack, higher softness and ductility, and increased seal strength which favors the formation of a hermetic seal when the composite film structure is ultimately folded over and sealed to form a seal on a bag, pouch or other flexible package. One suitable m-LLDPE resin employed in the second and/or third sealant layers (12b and 12c, respectively) is Elite® 5815 (Dow Chemical Co.) based on ethylene-octene copolymer. Another suitable m-LLDPE resin is Evolue® SP1540 (Mitsui Chemicals Co.), an m-LLDPE resin based on ethylene-hexene copolymer. Standard non-metallocene LLDPE-based resins can also be used in other embodiments in the second and/or third sealant layers (12b and 12c, respectively). The LLDPE and m-LLDPE resin selection is based on upon material that exhibits lower storage modulus—particularly at lower frequencies—as this has a higher propensity to flow and to "caulk" up any open gaps created in the bag-making process when the composite film structure is ultimately folded over and sealed to form a seal on a bag, pouch or other flexible package.

The presence of the conventional LDPE component in the sublayers of the heat-sealant structure is important as it provides melt stability (resistance to drawdown) during extrusion coating. Typically, the content of the conventional LDPE resin in the sealant layers 12a, 12b, and 12c of the heat-sealant structure 12 is gradually stepped down as one moves from first sealant layer 12a to third sealant layer 12c. In other words, in typical embodiments, the content of the conventional LDPE resin in first sealant layer 12a is approximately 100 wt. %, about 60 wt. % to about 80 wt. % in second sealant layer 12b and about 4 wt. % to about 40 wt. % in third sealant layer 12c. The low end of the range comes from the LDPE present in LDPE-based slip and anti-block masterbatches which are described in more detail below. Conversely, the content of the active sealant ingredient (for example, the m-LLDPE component) is being stepped up as one moves from first sealant layer 12a to third sealant layer 12c. One reason for doing this relates to cost; another is to move gradually from a more stable (but poorly sealing) formulation to a less stable (if it were extruded directly upon the base film) but good sealing formulation. In some embodiments, another resin based on LLDPE (e.g., Affinity™ 1450 G1 from Dow Chemical Company) is added to third sealant layer 12c to provide improved hot tack.

In addition to the conventional LDPE resin, the m-LLDPE or LLDPE, and optionally plastomer, the heat-sealant structure 12 may also include additives. Non-limiting examples of desirable additives that may be used in the heat-sealant structure 12 are anti-block and slip additives. Antiblock and slip additives are typically solid particles dispersed within a layer to effectively produce a low coefficient of friction (COF) on the exposed surface. This low coefficient of friction assists the film to move smoothly through the film formation, stretching and wind-up operations. The anti-block and slip additives are added as minor components to the heat-sealant structure to facilitate handling. A slip additive enables individual sheets of film to slide past one other and also facilitates smooth movement through guiding rolls and other guides in bag-making equipment to reduce the coefficient of friction. Anti-block additives prevent the finished film from sticking onto itself when laid down in stacks or wound-up on a roll. Examples of suitable slip additives include, but are not limited to, fatty amides such as erucamide, oleamide, behenamide, oleamide, and stearamide. In embodiments, a commercially available slip masterbatch PM 14598 available from Techmer PM (polyethylene-based masterbatch of erucamide) is added in sealant layers 12b and 12c at a level of from about 3.5 to about 4.0 wt. %. Examples of suitable anti-block additives include solid particles with mean particle size diameters in the range of from about 0.5 to about 10 µm such as, but not limited to, silica ($SiO_2$), calcium carbonate ($CaCO_3$), alumina ($Al_2O_3$), and diatomaceous earth. In embodiments, a commercially available anti-block masterbatch Polybatch F20 available from A. Schulman (a LDPE-based masterbatch of natural silica at 20 wt. % loading) is added to the heat-sealant structure 12.

Figure 4A:
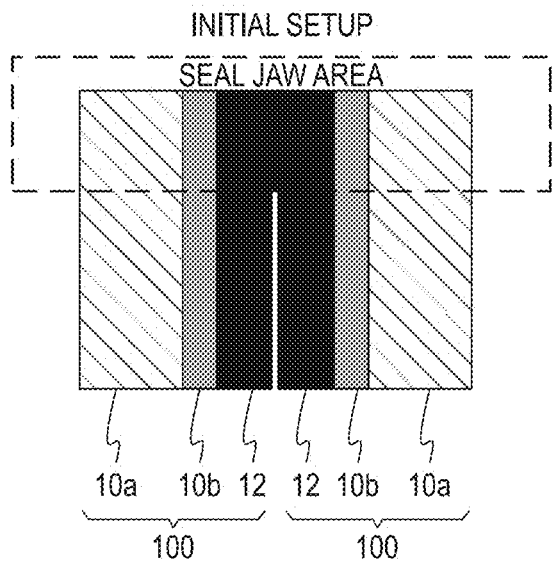
FIG. 4a represents a magnified cross-sectional view of two identical film sections according to one embodiment of the present invention where the composite film structure of FIG. 1 is attached by sealing a first location of the exposed side of the heat-sealant structure (12) to a second location of the heat-sealant structure (12), wherein the second location of the composite film structure is folded over to meet the first location.

Once the composite film structure of the invention is formed, the composite film structure can be laminated to another film structure and then folded over, the folded structure sealed and formed into a bag, pouch or other flexible package such as a food package, and the bag or package ultimately formed using form-film-seal processing. The composite film structures of the present invention are sealed via the respective heat-sealant structures. FIG. 4a shows a magnified cross-sectional view of two identical film sections according to one embodiment of the present invention where the composite film structure formed according to FIG. 1 is attached by sealing a first location on the exposed side of layer 12 (the heat-sealant structure) to a second location of layer 12 of the composite film structure, where the second location is folded over to meet the first location of the composite film structure.

Figure 4B:
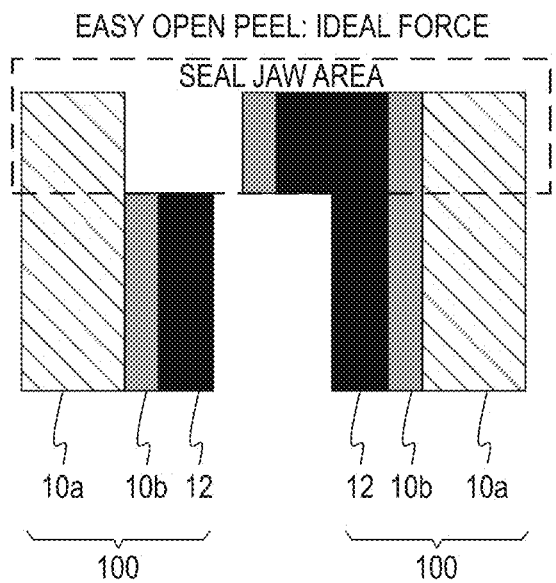
FIG. 4b represents a magnified cross-sectional view of the composite film structures of the present invention sealed together according to FIG. 4a, subjected to peeling and resulting in a clean peel by delaminating one metal layer (10b) portion from one biaxially-oriented film (10a) portion of one region of the composite film structure.

In contrast, FIG. 4b shows a magnified cross-sectional view of composite film structures of the present invention formed according to FIG. 1 which are sealed together as shown and described in FIG. 4a and subjected to peeling. As can be seen in FIG. 4b, where the first and second locations of layer 12 of the composite film structure of the present invention are sealed together and peeled apart, a clean separation or delamination occurs between one metal layer (10b) portion and one biaxially-oriented film (10a) portion of one region of the inventive composite film structure. The delamination occurs without forming any strings. This is possible through controlled failure at the interface between the metal portion and the biaxially-oriented film portion of the base film of the composite film structure.

Figure 4C:
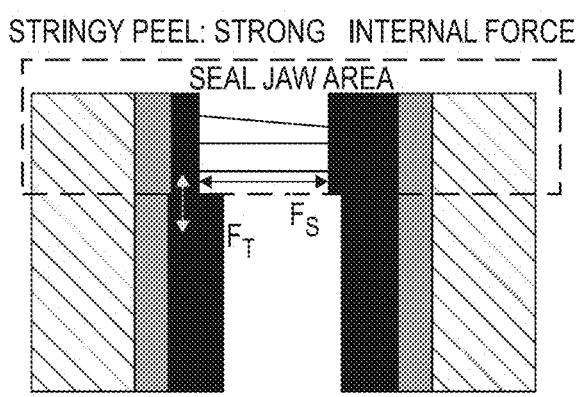
FIG. 4c represents a magnified cross-sectional view of prior art films sealed together and subjected to peeling, but resulting in separation within the seal layers where the peel is not clean and resulting in the formation of strings.

FIG. 4c shows a magnified cross-sectional view of prior art films sealed together and subjected to peeling where the peel or separation is not clean and results in the formation of strings. To further elaborate on the relationship between the adhesion strength between layers 10a and 10b and the internal strength of the sealant layer(s) 12, it is noted that increasing (through thickness or material selection) the internal tensile strength (which has a tensile strength component $F_T$ and a shear strength component $F_S$) will encounter a point where the sealant layer will not separate cleanly, causing stringing or fibrous strands that extend between the two separating surfaces. This is illustrated by FIG. 4c where the internal tensile strength of the sealant within its layer, $F_T$, is low and a clean cleave occurs between the non-seal and seal area of the sealant allowing the failure of the metal to come cleaning onto the opposite surface. When the internal strength ($F_T$) becomes too strong to fully cleave in the perpendicular axis, the adhesion strength to the base film plays little significance.

The composite film structures of the present invention provide easy open or easy peel characteristics, clean peel, and hermetic seal characteristics stemming from good caulkability characteristics when a region of the inventive composite film structure is ultimately folded over and sealed to form a seal on a bag, pouch or other flexible package. The composite film structures of the present invention have the following characteristics: (a) the metal adhesion or adhesion strength of the metal layer 10b to the biaxially-oriented film 10a of base film 10 less than about 800 g/in (about 315 g/cm) as measured by as detailed below; (b) the cumulative thickness of the heat-sealant structure (whether of the monolayer type as shown in structure 12 of FIG. 1 or of the multilayered type as shown in structure 12 of FIG. 3 containing three layers—sealant layers 12a, 12b, and 12c) ranging from about 50 to about 100 gauge (Ga) (about 13 to about 25 μm); and (c) the seal strength of the heat-sealant structure when sealed onto itself is from about 500 to about 1500 g/in (about 197 to about 590 g/cm) as detailed below, the seal of a region of the heat-sealant structure onto another region of the heat-sealant structure being peelable by hand with no stringing.

As detailed above, the metal adhesion or adhesion strength of the metal layer 10b to the biaxially-oriented film 10a of base film 10 is less than about 800 g/in (about 315 g/cm). In some embodiments, the adhesion strength is less than about 250 g/in (about 98 g/cm) or less than about 200 g/in (about 79 g/cm) in other embodiments. These metal adhesion or adhesion strength values facilitate easy separation through controlled failure at the interface between the metal portion (metal layer 10b) and the biaxially-oriented film portion (10a) of the base film (10) of the composite film structure. The industry standard equipment for measuring metal adhesion or adhesion strength in these types of films is a Sentinel® Sealer Model 12 ASL manufactured by Sencorp. The AIMCAL (Association of Industrial Metalizes, Coaters, and Laminators) test procedure TP-105-92 and metal adhesion test kits available from AIMCAL's website (www.aimcal.com) are industry standard tools for measuring metal adhesion or adhesion strength in these types of films. The metal adhesion or adhesion strength of the metal layer(s) to the biaxially-oriented film(s) described herein could be measured by equivalent equipment and test protocols as would be understood by one skilled in the art desiring to measure metal adhesion properties.

The adhesion strength of the biaxially-oriented film 10a to the metal layer 10b is lower than the bonding strength between the metal layer 10b and the optional primer layer 11 or, in the absence of a primer layer 11 is present, the bonding strength between the metal layer 10b and the heat-sealant structure. The adhesion strength is determined by the material(s) used in the biaxially-oriented film 10a lying adjacent to the metal layer 10b. The biaxially-oriented film 10a may comprise several coextruded and in-line coated sublayers in addition to a thicker core layer. Where present, the several coextruded and in-line coated sublayers act as functional sublayers for functions such as barrier, seal layer for subsequent laminations, etc.

As detailed above, the cumulative thickness of the heat-sealant structure (whether of the monolayer type as shown in structure 12 of FIG. 1 or of the multilayered type as shown in structure 12 of FIG. 3 containing three layers, sealant layers 12a, 12b, and 12c) is desirably higher than about 50 gauge (about 13 μm) or else the hermeticity is compromised and desirably less than about 100 gauge (about 25 μm) or else the peel is not clean. In some embodiments, the cumulative thickness of the heat-sealant structure is from about 55 to about 95 gauge (about 14 to about 24 μm), from about 60 to about 90 gauge (about 15 to about 23 μm), from about 65 to about 85 gauge (about 16 to about 21 μm), from about 70 to about 80 gauge (about 18 to about 20 μm), or from about 45 to about 75 μm (about 11 to about 19 μm).

As discussed above, the seal strength of a region of the heat-sealant structure onto another region of the heat-sealant structure is from about 500 to about 1500 g/in (about 197 to about 590 g/cm). The industry standard equipment for measuring seal strength in these types of films is a Lako Tool SL-10 Hot Tack Tester & Seal Tester manufactured by Testing Machines, Inc. The seal could be created and the seal strength of the heat-sealant structure could be measured by equivalent equipment as would be understood by one skilled in the art desiring to measure seal strength of heat-sealed films. Where the heat-sealant structure exhibits a seal strength in the range of about 500 to about 1500 g/in (about 197 to about 590 g/cm) as described herein, the layers exhibit easy peel characteristics and are peelable manually by hand with no stringing for a clean peel. Clean peel or a clean peel appearance means no "stringing" (i.e., no fibrous strands extending between the two separating surfaces) upon separation.

The inventors have found that caulkability of the active ingredient or sealant present in the heat-sealant structure (e.g., the LLDPE or the m-LLDPE) once a region of the inventive composite film structure is folded over onto another region of the inventive composite film structure (more specifically, a region of the heat-sealant structure folded onto another region of the heat-sealant structure) and sealed can be correlated to the value of the shear storage modulus at 190° C. The shear storage modulus or rotational viscometry profile at 190° C. can be described approximately by the mathematical expression $$G'=G'_0 \times \exp(b \times \omega')$$

where G' is the storage modulus in units dynes/cm$^2$, $\omega'$ is the angular velocity or rotational speed of the disk rheometer in rad/s, and parameters $G'_0$ and b are calculated by exponential curve fitting to the data of G' vs. $\omega'$ with parameter $G'_0$ (the physical meaning of which is the limit of storage modulus as $\omega'$ goes to 0) being less than 20 dynes/cm$^2$ and, more specifically, less than 15 dynes/cm$^2$ and parameter b ranging from 0.2 to 0.6 sec$^{-1}$ and, more specifically, 0.3 to 0.5 sec$^{-1}$ or 0.4 to 0.5 sec$^{-1}$.

Fold-overs within the film, at the ends or in the middle back fin/lap seal (also called the T zone) area are the most common leaking areas within a flexible package and the sealant must flow readily to fill these open mechanical gaps. LLDPE and m-LLDPE based resins that display the storage modulus vs. angular velocity curve similar or lower to Evolue® SP1540 (Mitsui Chemicals Co.) were found to be acceptable for achieving caulkability resulting in hermetic sealing. Curve-fitting to an exponential model allows one to quantify caulkability by the mathematical expression shown above.

Once the composite film structure is laminated onto additional film layers, folded over onto itself, sealed, and ultimately formed into a bag, pouch or other flexible package such as a food package using form-film-seal processing, the bag or package has a generally hermetic seal. This means the bag or package formed according to the invention shows no leaks during an industry-recognized standard test such as the "dunk test" such as that performed using the Package Integrity Model H Dunk Tank tester manufactured by Visual Check International Packaging Integrity Systems and using ASTM D3078-02 (2013). Stated another way, the formed flexible package passes the hermeticity test conducted using the Package Integrity Model H Dunk Tank Tester. The hermeticity could be measured by equivalent equipment as would be understood by one skilled in the art desiring to confirm that a bag or package shows no leaks.

Figure 7A:
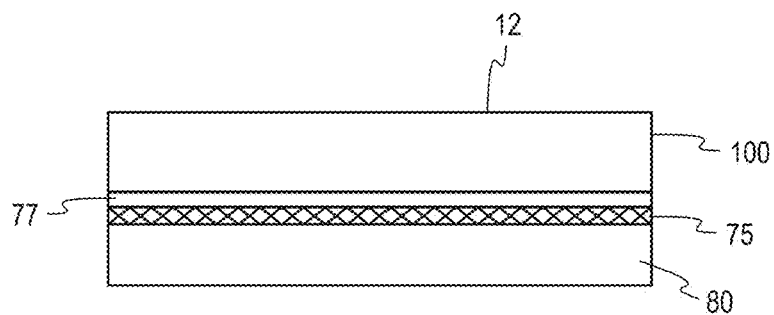
FIGS. 7a-7g illustrate a Vertical Form Fill Seal (VFFS) process for making bags using the inventive composite film structures.
Figure 7B:
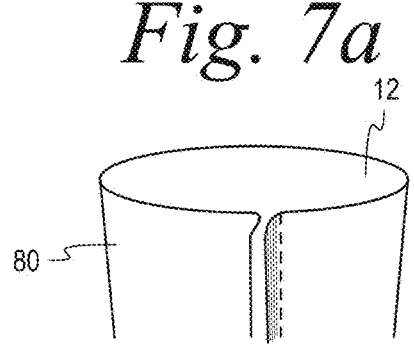
Figure 7C:
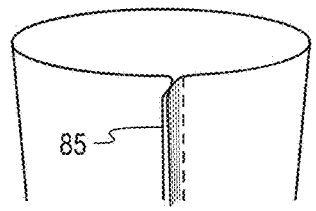
Figure 7D:
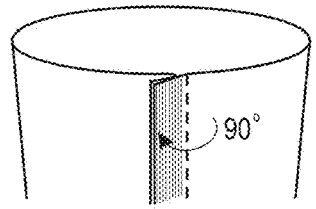
Figure 7E:
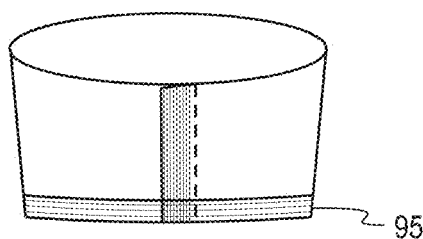
Figure 7F:
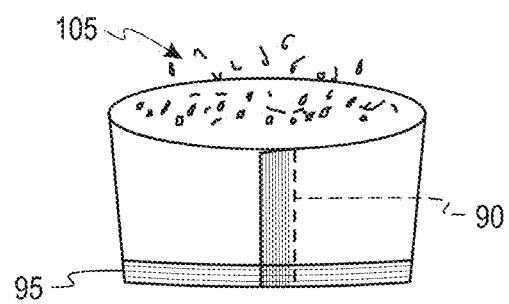
Figure 7G:
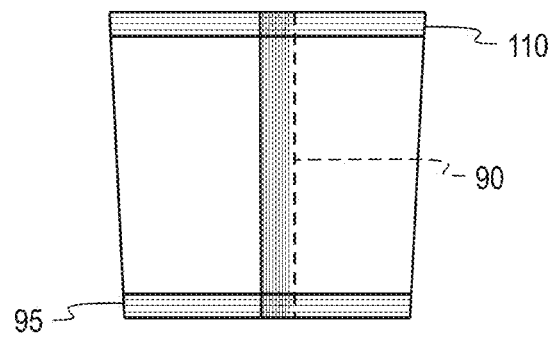

FIGS. 7a-7g illustrate a Vertical Form Fill Seal (VFFS) process for making a bag or pouch using an embodiment of the inventive composite film structure. In FIG. 7a, the final film structure used to construct a bag is shown which consists of the inventive composite film structure (which could, for example, be the composite film structure 100 of FIG. 1 as shown in FIG. 7a, the composite film structure 150 of FIG. 2 (not shown) or the composite film structure 200 of FIG. 3 (not shown)) laminated to a printed film. More specifically, the inventive composite film structure (e.g., the composite film structure 100 of FIG. 1, the composite film structure 150 of FIG. 2 or the composite film structure 200 of FIG. 3) is shown with the heat-sealant structure 12 on the exposed side. Adjacent to the composite film structure is a bonding layer 77 which can be a solvent-based adhesive, a solventless adhesive or an extrusion lamination layer such as Marflex® 1017 LDPE. Adjacent to the bonding layer 77 is a print layer 75 which contains print, text, images, etc. that will be seen by a consumer. Adjacent to the print layer 75 is a clear or generally clear film 80. Film 80 may be a BOPP film such as Torayfan® F61W-70 G (Toray Plastics (America), Inc.). Torayfan® F61W-70 G has one side treated with Toray's ultra high surface energy (UHSE) process, one side of heat sealable BOPP film, and a heat seal layer which contains slip additives for low and consistent coefficient of friction. Torayfan® F61W-70 G (the term "70 G" indicates the film thickness is 70 gauge or 17.5 µm) is designed to be the outside print web for VFFS applications. In FIG. 7b, the composite film structure is folded onto itself into a generally tube shape with the heat-sealant structure 12 on the inside of the tube and film 80 on the exterior side of the tube. With this arrangement, the print layer 75 and any print, text, images, etc. thereon are visible to the consumer due to the clear or generally clear nature of film 80. In FIG. 7c, a fin-seal formation process is undertaken at edge 85 to form a fin. In FIG. 7d, the fin is folded over (e.g., turned 90°) and the fin is adhered onto the tube to form the finalized vertical seal tube structure 90. In FIG. 7e, the bottom 95 is sealed to a form a bottom end-seal. In FIG. 7f, the bag content is filled with product 105 such as food. In FIG. 7g, the top 110 is sealed to a form a top end-seal.

EXAMPLES

The below examples further define various aspects of the present disclosure. These examples are intended to be illustrative only and are not intended to limit the scope of the present disclosure. Also, parts and percentages are by weight unless otherwise indicated. The present invention is illustrated by examples of certain representative embodiments thereof, wherein all parts, proportions and percentages are by weight unless otherwise indicated.

Testing Methods

The various properties in the below examples were measured by the following methods.

Extrusion coating was conducted on a Davis Standard extrusion coating line with in-line treatment, priming, and ozonation as noted in the examples. In this way, the bonding to the metal layer could be optimized and characterized.

Additionally, thickness of the extrusion coating sealant was examined to optimize the hermetic properties versus economics and overall production efficiencies. Films were created with 50, 75, and 100 gauge (12.7 µm, 19.0 µm, and 25.4 µm, respectively) of extrusion coating on Torayfan® PC1 60 G (60 gauge or 15.2 µm thickness) (Toray Plastics (America), Inc.). The resultant films were then extrusion laminated to a base film of Torayfan® F61W-70 G (Toray Plastics (America), Inc.) made of BOPP, produced into bags, and tested as described below. Torayfan® F61W-70 G has one side treated with Toray's ultra high surface energy (UHSE) process and one side heat sealable BOPP film. The heat seal layer contains slip additives for low and consistent coefficient of friction. Torayfan® F61W-70 G is designed to be the outside print web for VFFS applications.

Definitions of Thickness Units: Thickness of extruded films, coextruded film layers, and extrusion coated film layers is expressed in Ga (film gauge) units. 1 Ga equals 0.01 mil (1 mil=$\frac{1}{1000}$ in). The values in µm are also being provided. 1 Ga equals 0.0254 µm.

Thickness (more precisely weight per unit area) of coated primer is expressed in units of #/rm (pounds per ream). Ream is a unit of surface area equal to 3000 $ft^2$ or 432,000 $in^2$ (equal to 278.7 $m^2$).

Testing Methodologies

Polymer rheology was conducted utilizing a TA Instruments Ares G2 rheometer. All testing occurred at 190° C. unless otherwise noted and frequency sweeps were conducted. All polymer plaques were created by heating and compressing the incoming pellets in a heated Carver press within a uniform 1 mm shim. Specimen selection was careful to avoid air bubbles or other defects that could alter rheological properties.

Metal adhesion strength was measured by heat sealing on a Sentinel® Sealer Model 12 ASL at 104.4° C. (220° F.) seal temperature, 15 second dwell, and 15 psi (103.42 kPa) seal jaw pressure, a piece of 1-mil (25 µm) thick ethylene acrylic acid (EAA) polymer film to the metalized surface of a single sheet of metalized film and measuring the 180° C. peel strength of the metal from the base or substrate substantially in accordance with AIMCAL (Association of Industrial Metalizes, Coaters, and Laminators) test procedure TP-105-92. The test procedure and a metal adhesion test kit of materials was obtained from AIMCAL's website (www.aimcal.com). The test kit contained 2 rolls of 3M™ tape #610, 2 rolls of EAA film and an AIMCAL Metalizing Technical Reference Manual. The test procedure used in testing the samples used in the examples of this application is described in AIMCAL Metalizing Technical Reference (Third Edition, © 2001).

Extrusion bonding measurements were conducted by placement of kraft paper with an adhesive and non-adhesive portion placed or dropped between the extrusion melt curtain and the base or substrate film. The adhesive portion was positioned to adhere to the base or substrate film and help convey the paper, while the non-adhesive portion asssisted in measurements as described below. Once collected, the extrusion coated/kraft paper/substrate product was collected and cut into 1" strips. Due to the non-adhesive portion of the paper, the paper did not adhere to the base or substrate film though the extrusion coating was deposited to the paper. The sample was pulled in a standard T peel configuration on a standard tensile measurement device, where the base or substrate film was in the upper jaw, the kraft paper/extrusion coating portion was within the bottom jaw and the film/ extrusion coating only sample was at 90°. For testing, an Instron® 3343 tensile tester was used with jaws separated by 1.25 inches (3.12 cm), and a pull rate of 6 inches/min (15.2 cm/min) was used. Pull forces recorded as well as examining how the failure occurred provided general information on failure type. Where the bond line did not move, bonding to the base or substrate was usually very high and pull forces recorded were generally related to the mechanical strength of the particular polymer and thickness of the extrusion coating. If the bond line moved easily while being pulled, the pull force values were generally associated more with the actual bonding strength between the extrusion coating and the base film.

Seal strength was tested by conducting heat-sealing on using a Lako Tool SL-10 Hot Tack Tester & Seal Tester manufactured by Testing Machines, Inc. A 1"-wide piece of film was folded onto itself in the heated jaws of the Lako Tool, closing and holding at 0.5 seconds dwell, 30 psi (2.1 kg/cm$^2$) seal force with a 15 second cooling delay. The Lako SL-10 unit then tested the seal strength when pulled at a speed of 0.2 in/sec and resulting forces were recorded. Temperatures were varied to test the film response at different sealing temperature conditions. The resulting seal strength was tested and expressed in g/in.

Finished bag testing was simulated by 10#/rm Marflex® 1017 LDPE extrusion lamination of target films with Torayfan® F61W-70 G BOPP film. All bags were formed using a Hayssen Flexible Systems Ultima® SV High Speed Intermittent Motion 15-19 HP Vertical Form Fill Seal (VFFS) Bagger/Packaging Machine in a standard pillow bag format. Empty bags were run at a 60 bag/minute speed and were run to a 10" bag width. Bags were collected and tested according to ASTM D3078-02 (2013) in a Package Integrity Tester Model H "Dunk Tank" manufactured by Visual Check International Packaging Integrity Systems where the bags were placed under water and vacuum applied to visually observe any air leakage. Any leak positions and leakage rates were noted and compared. Additionally, the seal locations were collected and cross-sectioned and inspected on a FEI Quanta 200 Environmental Scanning Electron Microscope (ESEM).

Raw Materials

Figure 5:
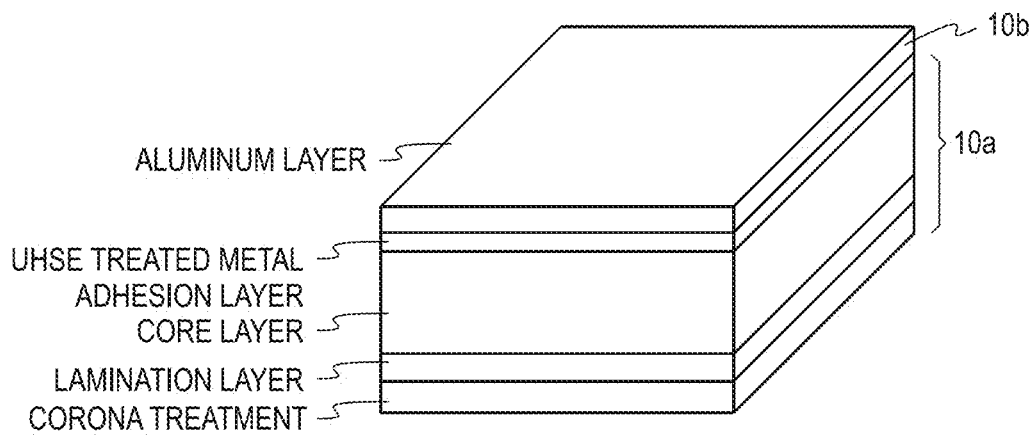
FIG. 5 shows one example of the structure of base film 10 according to FIG. 1.
Figure 6:
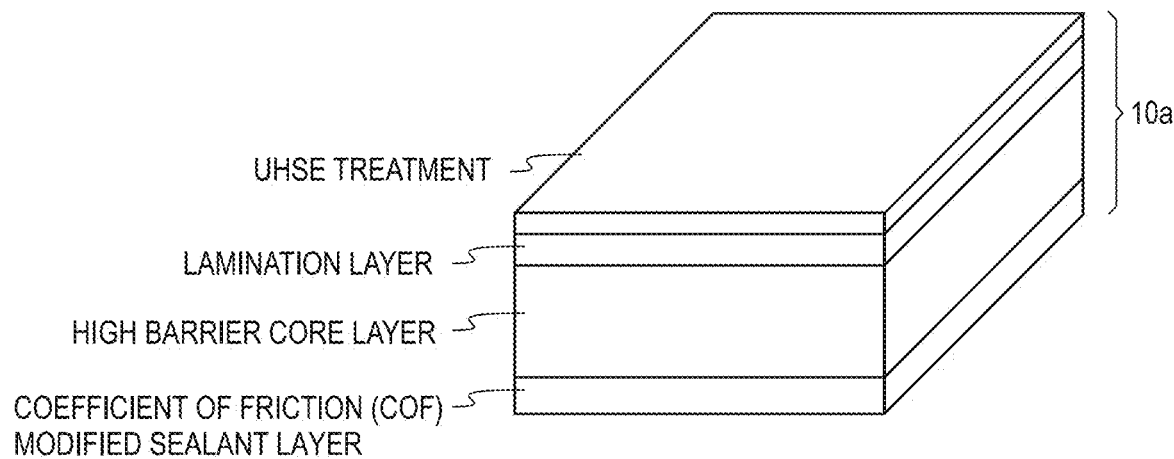
FIG. 6 shows another type of base film, a comparative example lacking a metal layer in the base film.

Base (Substrate) Films: The following commercial biaxially-oriented polypropylene films available from Toray Plastics America, Inc. were used in Examples 1-2 and Comparative Examples 1-3: Torayfan® PC1 (a biaxially-oriented polypropylene (BOPP) film having an oriented polypropylene (OPP) core and a metalized layer, aluminum representing the base film 10 having a biaxially-oriented film 10*a* and a metal layer 10*b*) and Torayfan® CBC (non-metalized) (a biaxially-oriented polypropylene (BOPP) film having an oriented polypropylene (OPP) core without a metalized layer, representing the base film 10 having a biaxially-oriented film 10*a* but lacking a metal layer 10*b*). The detailed structures of the Torayfan® PC1 and the Torayfan® CBC base films used in Examples 1-2 and Comparative Examples 1-3 are shown in FIGS. 5-6. As shown in FIG. 5, Torayfan® PC1 has vacuum deposited aluminum on a Toray ultra high surface energy (UHSE) treated metal adhesion layer with a BOPP core layer and is subjected to corona treated on the opposing side. As shown in FIG. 6, Torayfan® PC1 has vacuum deposited aluminum on a Toray ultra high surface energy (UHSE) treated metal adhesion layer with a BOPP core layer and is subjected to corona treated on the opposing side.

Marflex® 1017: A low-density (LDPE) resin produced by Chevron Philips (density 0.917 g/cc), melt index 7 g/10 min, melting point 106° C.).

Elite® 5815: A metallocene-catalyzed linear low density resin produced by Dow Chemical Company (density 0.91 g/cc, melt index 15 g/10 min, melting peaks at 96.4° C., 114° C., 124° C.).

Affinity™ PT 1450: A metallocene-catalyzed linear low density resin produced by Dow Chemical Company (density 0.902 g/cc, melt index 7.5 g/10 min), melting point 98.8° C.

PM 14598: A slip additive masterbatch (active ingredient erucamide) produced by Techmer PM for use in polyethylenes (melting peaks 81.3° C. and 105.1° C.).

Polybatch F20: An anti-block additive masterbatch (active ingredient natural silica with an average size of 9 µm, present at 20 wt. %) produced by A. Schulman for use in polyethylenes (melting point 122.5° C.).

Example 1

Commercially available Torayfan® PC1 60 G film was treated with 0.2 W/m$^2$ corona treatment to clean the surface, then in-line coated with Mica Corporation A-131-X primer such that the dry coating weight was 0.01 #/rm. The primed film was then extrusion coated with a coex structure of 28 gauge of 100% Chevron Phillips Marflex® 1017 LDPE/36 gauge of 80% Marflex® 1017, 16% Elite® 5815, and 4% Techmer PM 14598 slip/11 gauge of 35.5% Marflex® 1017, 60% Elite® 5815, 3.5% PM 14598, and 1.0% A. Schulman Polybatch F20. The total resultant film thickness was 135 gauge. After converting to finished film through extrusion lamination to 70 gauge BOPP film, the bag from the finished structure was subjected to both the hermeticity test and the easy open test.

Example 2

Commercially available Torayfan® PC1 60 G film was treated with 0.2 W/m$^2$ corona treatment to clean the surface, then in-line coated with Mica Corporation A-131-X primer such that the dry coating weight was 0.01 #/rm. The primed film was then extrusion coated with a coex structure of 28 gauge of 100% Chevron Phillips Marflex® 1017 LDPE/36 gauge of 60% Marflex® 1017, 36.5% Elite® 5815, and 3.5% Techmer PM 14598 slip/11 gauge of 79.5% Elite® 5815, 15.0% Affinity™ PT 1450 G1, 3.5% PM 14598, and 2.0% A. Schulman Polybatch F20. The total resultant film thickness was 135 gauge. Similar to Example 1, a bag from the finished structure was subjected to both the hermeticity test and the easy open test.

Comparative Example 1

Commercially available Torayfan® PC1 60 G film was treated with 0.2 W/m$^2$ corona treatment to clean the surface, then in-line coated with Mica Corporation A-131-X primer such that the dry coating weight was 0.01 #/rm. The primed film was then extrusion coated with a coex structure of 18 gauge of 100% Chevron Phillips Marflex® 1017 LDPE/25 gauge of 80% Marflex® 1017, 16% Elite® 5815, and 4% Techmer PM 14598 slip/7 gauge of 35.5% Marflex® 1017, 60% Elite® 5815, 3.5% PM 14598, and 1.0% A. Schulman Polybatch F20. The resultant bag after film conversion passed the easy open test but failed the hermeticity test, indicative that a 50 gauge (12.7 µm) compound thickness of the sealant layers (other than thickness, identical in composition to example 1) is too low.

Comparative Example 2

Commercially available Torayfan® PC1 60 G film was treated with 0.2 W/m² corona treatment to clean the surface, then in-line coated with Mica Corporation A-131-X primer such that the dry coating weight was 0.01 #/rm. The primed film was then extrusion coated with a coex structure of 30 gauge of 100% Chevron Phillips Marflex® 1017 LDPE/56 gauge of 80% Marflex® 1017, 16% Elite® 5815, and 4% Techmer PM 14598 slip/14 gauge of 35.5% Marflex® 1017, 60% Elite® 5815, 3.5% PM 14598, and 1.0% A. Schulman Polybatch F20. The total resultant film thickness was 160 gauge. The resultant bag after film conversion passed the hermeticity test but failed the easy open test, indicative that a 100 gauge (25.4 µm) compound thickness of the sealant layers (other than thickness, identical in composition to example 1) is too high.

Comparative Example 3

Commercially available Torayfan® PC1 60 G film was treated with 0.2 W/m² corona treatment to clean the surface, then in-line coated with Mica Corporation A-131-X primer such that the dry coating weight was 0.01 #/rm. The primed film was then extrusion coated with a coex structure of 35 gauge of 100% Chevron Phillips Marflex® 1017 LDPE/53 gauge of 60% Marflex® 1017, 36.5% Dow Elite® 5815, and 3.5% Techmer PM 14598 slip/12 gauge of 79.5% Elite® 5815, 15.0% Affinity™ PT 1450 G1, 3.5% PM 14598, and 2.0% A. Schulman Polybatch F20. The total resultant film thickness was 160 gauge. The resultant bag after film conversion passed the hermeticity test but failed the easy open test, indicative that a 100 gauge (25.4 µm) compound thickness of the sealant layers (other than thickness, identical to composition to example 2) is too high.

Comparative Example 4

Commercially available Torayfan® CBC 80 G film was treated with 0.2 W/m² corona treatment to clean the surface, then in-line coated with Mica Corporation A-131-X primer such that the dry coating weight was 0.01 #/rm. The primed film was then extrusion coated with a coex structure of 28 gauge of 100% Chevron Phillips Marflex® 1017 LDPE/36 gauge of 60% Marflex® 1017, 36.5% Elite® 5815, and 3.5% Techmer PM 14598 slip/11 gauge of 79.5% Elite® 5815, 15.0% Affinity™ PT 1450 G1, 3.5% PM 14598, and 2.0% A. Schulman Polybatch F20. The total resultant film thickness was 135 gauge. The resultant bag after film conversion passed the hermeticity test but failed the easy open test due to the fact that the Torayfan® CBC base film lacked a metal layer and, thus, easy peel at the interface of the metal and base film was not possible.

Comparative Example 5

Figure 8:
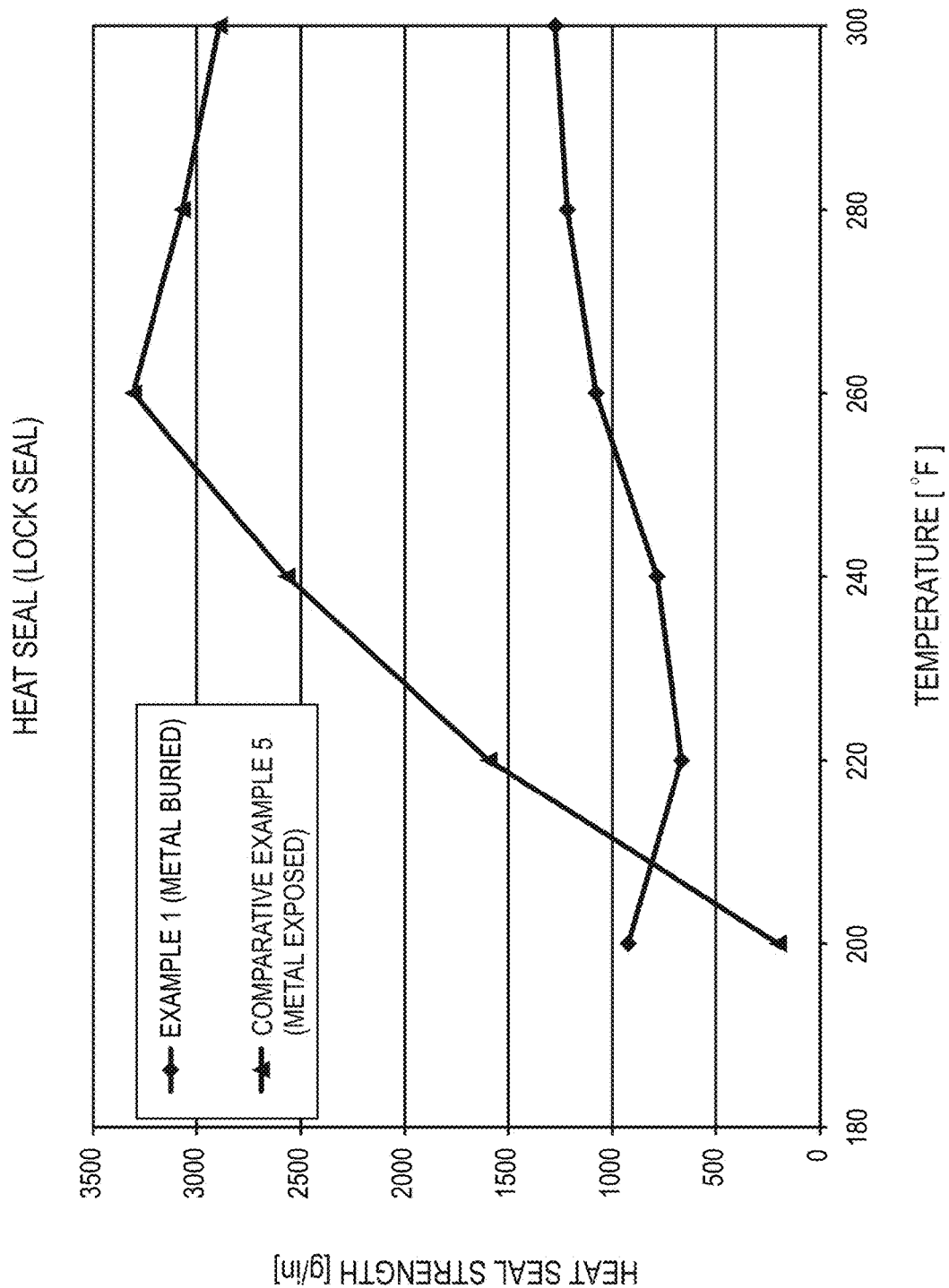
FIG. 8 is a plot showing heat seal strength versus temperature.

Example 1 was repeated with the difference that the extrusion coating of the sealant layers was conducted on the non-metalized side of the Torayfan® PC1 60 G base film. While the film of Comparative Example 5 passed the hermeticity test, the film of Comparative Example 5 did not pass the easy open test due to the fact that the seal layer extrusion coating was not on the metal side. This can also be visualized in the plot of heat seal strength vs. temperature in FIG. 8. While the film of Example 1 produced heat seal values in the range of 500-1500 g/in (197-590 g/cm), the film of Comparative Example 5 produced heat seal values above that range.

The film preparations of the Examples 1-2 and Comparative Examples 1-5 are shown below in Tables 2-4.

TABLE 2

| | Example | | | |
|---|---|---|---|---|
| | Example 1 | | Example 2 | |
| | Composition | Thickness | Composition | Thickness |
| Overall Structure | | 135 G* (34.3 µm) | | 135 G (34.3 µm) |
| Base Film (10) | Torayfan ® PC1 60 G film | 60 G (15.2 µm) | Torayfan ® PC1 60 G film | 60 G (15.2 µm) |
| Treatment | Corona | 0.2 W/m² | Corona | 0.2 W/m² |
| Primer (11) | Mica A-131-X | 0.01 #/rm | Mica A-131-X | 0.01 #/rm |
| Ozone | Y St 2 | | Y St 2 | |
| Sealant Layer (12a) of Heat-Sealant Structure (12) | Marflex ® 1017 LDPE 100% | 28 G (7.1 µm) | Marflex ® 1017 LDPE 100% | 28 G (7.1 µm) |
| Sealant Layer (12b) of Heat-Sealant Structure (12) | Marflex ® 1017 LDPE 80% Elite ® 5815 16% Techmer PM 14598 4% | 36 G (9.1 µm) | Marflex ® 1017 LDPE 60% Elite ® 5815 36.5% Techmer PM 14598 3.5% | 36 G (9.1 µm) |
| Sealant Layer (12c) of Heat-Sealant Structure (12) | Marflex ® 1017 35.5% Elite ® 5815 60% Techmer PM 14598 3.5% A. Schulman Polybatch F20 1.0% | 11 G (2.8 µm) | Elite ® 5815 79.5% Affinity ™ PT 1450 G1 15.0% Techmer PM 14598 3.5% A. Schulman Polybatch F20 2.0% | 11 G (2.8 µm) |
| Total Heat-Sealant Structure Thickness | | 75 G (19.0 µm) | | 75 G (19.0 µm) |
| Hermeticity Test | | Pass | | Pass |
| Easy Open Test | | Pass | | Pass |

*G = Gauge

TABLE 3

| | Example | | | |
|---|---|---|---|---|
| | Comparative Example 1 | | Comparative Example 2 | |
| | Composition | Thickness | Composition | Thickness |
| Overall Structure | | 110 G (27.9 μm) | | 160 G (40.6 μm) |
| Base Film (10) | Torayfan ® PC1 60 G film | 60 G (15.2 μm) | Torayfan ® PC1 60 G film | 60 G (15.2 μm) |
| Treatment Primer (11) Ozone | Corona Mica A-131-X Y St 2 | 0.2 W/m² 0.01 #/rm | Corona Mica A-131-X Y St 2 | 0.2 W/m² 0.01 #/rm |
| Sealant Layer (12a) of Heat-Sealant Structure (12) | Marflex ® 1017 LDPE 100% | 18 G (4.5 μm) | Marflex ® 1017 LDPE 100% | 30 G (7.6 μm) |
| Sealant Layer (12b) of Heat-Sealant Structure (12) | Marflex ® 1017 LDPE 80% Elite ® 5815 16% Techmer PM 14598 4% | 25 G (6.3 μm) | Marflex ® 1017 LDPE 80% Elite ® 5815 16% Techmer PM 14598 4% | 56 G (14.2 μm) |
| Sealant Layer (12c) of Heat-Sealant Structure (12) | Marflex ® 1017 35.5% Elite ® 5815 60% Techmer PM 14598 3.5% A. Schulman Polybatch F20 1.0% | 7 G (1.8 μm) | Marflex ® 1017 35.5% Elite ® 5815 60% Techmer PM 14598 3.5% A. Schulman Polybatch F20 1.0% | 14 G (35.6 μm) |
| Total Heat-Sealant Structure Thickness | | 50 G (12.7 μm) | | 100 G (25.4 μm) |
| Hermeticity Test | | Fail (sealant layer too thin) | | Pass |
| Easy Open Test | | Pass | | Fail (Sealant layer too thick) |

TABLE 4

| | Example | | | |
|---|---|---|---|---|
| | Comparative Example 3 Composition | Thickness | Comparative Example 4 Composition | Thickness |
| Overall Structure | | 160 G (40.6 μm) | | 155 G (39.4 μm) |
| Base Film (layer 10) | Torayfan ® PC1 60 G film | 60 G (15.2 μm) | Torayfan ® CBC 80 G film | 80 G (20.3 μm) |
| Treatment Primer (layer 11) Ozone | Corona Mica A-131-X Y St 2 | 0.2 W/m² 0.01 #/rm | Corona Mica A-131-X Y St 2 | 0.2 W/m² 0.01 #/rm |
| Sealant Layer (12a) of Heat-Sealant Structure (12) | Marflex ® 1017 LDPE 100% | 35 G (8.9 μm) | Marflex ® 1017 LDPE 100% | 28 G (7.1 μm) |
| Sealant Layer (12b) of Heat-Sealant Structure (12) | Marflex ® 1017 LDPE 60% Elite ® 5815 36.5% Techmer PM 14598 3.5% | 53 G (13.5 μm) | Marflex ® 1017 LDPE 60% Elite ® 5815 36.5% Techmer PM 14598 3.5% | 36 G (9.1 μm) |
| Sealant Layer (12c) of Heat-Sealant Structure (12) | Elite ® 5815 79.5% Affinity ™ PT 1450 G1 15.0% Techmer PM 14598 3.5% A. Schulman Polybatch F20 2.0% | 12 G (30.5 μm) | Elite ® 5815 79.5% Affinity ™ PT 1450 G1 15.0% Techmer PM 14598 3.5% A. Schulman Polybatch F20 2.0% | 11 G (2.8 μm) |
| Total Heat-Sealant Structure Thickness | | 100 G (25.4 μm) | | 75 G (19.0 μm) |
| Hermeticity Test | | Pass | | Pass |
| Easy Open Test | | Fail (Sealant layer too thick) | | Fail (No metal layer) |

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims. The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

We claim:

1. A composite film structure comprising:
   a base film comprising a biaxially-oriented film and a metal layer, wherein the biaxially-oriented film is adjacent to the metal layer; and
   a heat-sealant structure having a thickness being from about 65 to about 85 gauge, the heat-sealant structure comprising a first layer consisting of low density polyethylene, a second layer consisting essentially of from about 60 to about 80 wt. % of a low density polyethylene with the remainder being a LLDPE-based resin, and a third layer consisting essentially of from about 4 to about 40 wt. % low density polyethylene with the remainder being a LLDPE-based resin, the first layer located adjacent to the second layer, the second layer located adjacent to the third layer and the first layer located adjacent to the metal layer, the LLDPE-based resin being a linear low density polyethylene or a metallocene-catalyzed linear low density polyethylene, wherein the adhesion strength between the biaxially-oriented film and the metal layer is less than about 250 g/in, the seal strength of the composite film structure heat-sealed onto itself on the heat-sealant side of the composite film structure is from about 500 g/in to about 1500 g/in, the heat-seal being a hermetic seal,
   wherein the low density polyethylene resin content in the heat-sealant structure is from about 50 to about 90 wt. % and the LLDPE-based resin content in the heat-sealant structure is from about 5 to about 50 wt. %,
   whereby separation of the heat-sealed composite film structure occurs at an interface between the metal layer and the biaxially-oriented film and is characterized by the absence of stringing.

2. The composite film structure of claim 1, further comprising a primer layer located between the first layer of the heat-sealant structure and the metal layer.

3. The composite film structure of claim 1, wherein the adhesion strength between the biaxially-oriented film and the metal layer is less than about 200 g/in.

4. The composite film structure of claim 1, wherein the base film comprises biaxially-oriented polyester.

5. The composite film structure of claim 4, wherein the biaxially-oriented polyester is a homopolyester or copolyester of polyethylene terephthlate.

6. The composite film structure of claim 1, low density polyethylene resin content in the heat-sealant structure is from about 60 to about 85 wt. % and the LLDPE-based resin content in the heat-sealant structure is from about 10 to about 40 wt. %.

7. The composite film structure of claim 6, wherein the low density polyethylene resin content in the heat-sealant structure is from about 65 to about 80 wt. % and the LLDPE-based resin content in the heat-sealant structure is from about 20 to about 35 wt. %.

8. The composite film structure of claim 1, wherein the linear low density polyethylene in the heat-sealant structure has a rotational viscometry profile at 190° C. approximated by the following mathematical equation:

$$G'=G'_0 \times \exp(b \times \omega^{\cdot}),$$

wherein G' is the storage modulus in units dynes/cm$^2$, $\omega^{\cdot}$ is the rotational speed of the disk rheometer in rad/s, and G'$_0$ and b are calculated by exponential curve fitting of G' versus $\omega^{\cdot}$, wherein G'$_0$ is less than about 20 dynes/cm' and b is from about 0.2 to about 0.6 sec$^{-1}$.

9. The composite film structure of claim 1, wherein the metallocene-catalyzed linear low density polyethylene in the heat-sealant structure has a rotational viscometry profile at 190° C. approximated by the following mathematical equation:

$$G'=G'_0 \times \exp(b \times \omega^{\cdot})),$$

wherein G' is the storage modulus in units dynes/cm$^2$, $\omega^{\cdot}$ is the rotational speed of the disk rheometer in rad/s, and G'$_0$ and b are calculated by exponential curve fitting of G' versus $\omega^{\cdot}$, wherein G'$_0$ is less than about 20 dynes/cm' and b is from about 0.2 to about 0.6 sec$^{-1}$.

10. A bag seal formed from the composite film structure of claim 1, wherein the bag seal passes the dunk test using a Package Integrity Model H Dunk Tank tester manufactured by Visual Check International Packaging Integrity Systems and ASTM D3078-02 (2013).

11. The composite film structure of claim 1, wherein the base film comprises biaxially-oriented polypropylene.

12. The composite film structure of claim 1, wherein the heat-sealant structure has a thickness from about 70 to about 80 gauge.

* * * * *